(12) United States Patent
Xiong

(10) Patent No.: US 9,510,185 B2
(45) Date of Patent: Nov. 29, 2016

(54) METHOD, TERMINAL, SERVER, AND SYSTEM FOR MULTIPLE TERMINALS TO SHARE VIRTUAL SIM CARD

(71) Applicant: Huawei Technologies Co., Ltd., Shenzhen (CN)

(72) Inventor: Yingying Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/568,610

(22) Filed: Dec. 12, 2014

(65) Prior Publication Data

US 2015/0099562 A1   Apr. 9, 2015

Related U.S. Application Data

(63) Continuation of application No. PCT/CN2014/078375, filed on May 26, 2014.

(30) Foreign Application Priority Data

Jul. 31, 2013 (CN) .......................... 2013 1 0329442

(51) Int. Cl.
*H04B 1/38* (2015.01)
*H04M 1/00* (2006.01)
*H04W 8/18* (2009.01)
*H04W 8/20* (2009.01)
*H04W 12/04* (2009.01)
*H04W 12/06* (2009.01)

(52) U.S. Cl.
CPC ............. *H04W 8/183* (2013.01); *H04W 8/205* (2013.01); *H04W 12/04* (2013.01); *H04W 12/06* (2013.01)

(58) Field of Classification Search
CPC .... H04W 8/183; H04W 12/04; H04W 8/205
USPC .................................. 455/557, 558
See application file for complete search history.

(56) References Cited

U.S. PATENT DOCUMENTS

2004/0042442 A1* 3/2004 Pecen ................... H04W 12/04
370/352
2004/0204093 A1* 10/2004 Imaeda .............. H04N 1/00127
455/558

(Continued)

FOREIGN PATENT DOCUMENTS

CN      101563943 A    10/2009
CN      101742731 A     6/2010

(Continued)

OTHER PUBLICATIONS

Extended European Search Report for Application No. 14808473.4, mailed Aug. 5, 2015, 7 pages.

*Primary Examiner* — Ayodeji Ayotunde
(74) *Attorney, Agent, or Firm* — Slater Matsil, LLP

(57) ABSTRACT

An embodiment method includes receiving, by a virtual card server from a first terminal, a request for enabling a virtual SIM card, where the request for enabling the virtual SIM card includes a virtual SIM card identifier, where the first terminal stores data of the virtual SIM card and a second terminal stores data of the virtual SIM card and determining whether the second terminal has enabled the virtual SIM card in accordance with the virtual SIM card identifier. The method also includes enabling the virtual SIM card for the first terminal when the second terminal has not enabled the virtual SIM card.

11 Claims, 12 Drawing Sheets

(56) References Cited

U.S. PATENT DOCUMENTS

2008/0081611 A1* 4/2008 Hoyt .................. H04W 8/205
 455/425
2011/0306318 A1* 12/2011 Rodgers ............... H04W 8/183
 455/410
2012/0108294 A1* 5/2012 Kaul ................... G06K 7/0013
 455/558

FOREIGN PATENT DOCUMENTS

| CN | 102291716 | 12/2011 |
| CN | 102932531 A | 2/2013 |
| CN | 103391535 A | 11/2013 |
| EP | 2076071 A1 | 7/2009 |
| WO | 2012058099 A1 | 5/2012 |

* cited by examiner

METHOD, TERMINAL, SERVER, AND SYSTEM FOR MULTIPLE TERMINALS TO SHARE VIRTUAL SIM CARD

This application is a continuation of International Application No. PCT/CN2014/078375, filed on May 26, 2014, which claims priority to Chinese Patent Application No. 201310329442.6, filed on Jul. 31, 2013, both of which are hereby incorporated by reference in their entireties.

TECHNICAL FIELD

The present invention relates to the field of computer and communications technologies, and in particular, to virtual subscriber identity module (SIM) card sharing.

BACKGROUND

At present, with the rapid development of communications technologies and mobile terminals, a common subscriber may have multiple mobile terminals, such as multiple mobile phones or multiple tablet computers. Therefore, subscribers may want to share one SIM card between multiple terminals.

When a subscriber using a physical SIM card wants to share the SIM card among multiple mobile terminals, the subscriber manually takes out the physical SIM card from one terminal and installs the physical SIM card on another mobile terminal. It is troublesome to manually take out and install the physical SIM card. If the subscriber needs to switch the physical SIM card between multiple mobile terminals frequently, it is very inconvenient.

SUMMARY

An embodiment method includes receiving, by a virtual card server from a first terminal, a request for enabling a virtual SIM card, where the request for enabling the virtual SIM card includes a virtual SIM card identifier, where the first terminal stores data of the virtual SIM card and a second terminal stores data of the virtual SIM card and determining whether the second terminal has enabled the virtual SIM card in accordance with the virtual SIM card identifier. The method also includes enabling the virtual SIM card for the first terminal when the second terminal has not enabled the virtual SIM card.

An embodiment method includes sending, by a first terminal to a virtual card server, a request for enabling a virtual SIM card, where the request for enabling the virtual SIM card includes a virtual SIM card identifier, where the first terminal stores first data of the virtual SIM card, and where a second terminal stores second data of the virtual SIM card and determining whether the second terminal has enabled the virtual SIM card. The method also includes receiving, by the first terminal from the virtual card server, an enabling response message after determining whether the second terminal has enabled the virtual SIM card, where, when the second terminal has not enabled the virtual SIM card, the enabling response message is an enabling success message and enabling, by the first terminal, the virtual SIM card after receiving the enabling success message.

An embodiment virtual card server includes a processor and a non-transitory computer-readable storage medium storing programming for execution by the processor. The programming including instructions to receive a request for enabling a virtual SIM card from a first terminal and receive a request for disabling the virtual SIM card from the first terminal. The programming also includes instructions to receive a request for subscribing to the virtual SIM card from the first terminal and determine, in accordance with a virtual SIM card identifier, whether a second terminal has enabled the virtual SIM card. Additionally, the programming includes instructions to enable the virtual SIM card for the first terminal after the request for enabling the virtual SIM card and sent by the first terminal is received when the second terminal has not enabled the virtual SIM card.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As mobile terminals gradually become popular, a common subscriber may have multiple mobile terminals, such as multiple mobile phones or multiple tablet computers. Subscribers want to conveniently share one subscriber identity module (SIM) card between multiple terminals. An embodiment provides a method for multiple terminals to share a virtual SIM card. In the embodiment, the multiple terminals share one virtual SIM card. That is, the multiple terminals all download data of the virtual SIM card. However, before each terminal wants to enable the virtual SIM card, that is, access a mobile network by using the virtual SIM card, each terminal needs to apply to a virtual card server; the virtual card server allows or prevents, when it is ensured that only one terminal accesses the mobile network by using the virtual SIM card at a same moment, enabling the virtual SIM card for the terminal that initiates the application.

The following further describes specific implementation manners of the present invention in detail with reference to the accompanying drawings and the embodiments. The following embodiments are used to describe the present invention and are not intended to limit the scope of the present invention.

Embodiment 1

Figure 1:
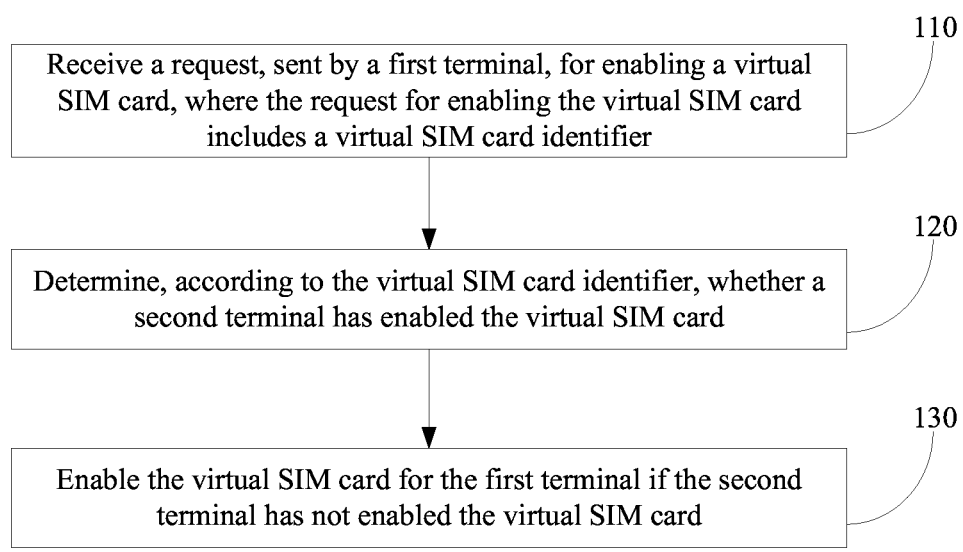
FIG. 1 is a flowchart of an embodiment method for multiple terminals to share a virtual subscriber identity module (SIM) card.

FIG. 1 is a flowchart of a method for multiple terminals to share a virtual SIM card according to an embodiment. As shown in FIG. 1, a first terminal and a second terminal store data of a same virtual SIM card, and the method includes the following steps:

110. Receive a request, sent by the first terminal, for enabling the virtual SIM card, where the request for enabling the virtual SIM card includes a virtual SIM card identifier.

Further, the method may be performed by a virtual card server. The first terminal and the second terminal are generally mobile terminals, such as mobile phones, and may also be non-mobile terminals, such as desktop computers. Moreover, the first terminal and the second terminal should support the virtual SIM card. Communication networks between the first terminal and the virtual card server and between the second terminal and the virtual card server may generally be wireless networks such as wireless fidelity WiFi networks, and may also be wired networks.

The first terminal may automatically obtain the virtual SIM card identifier according to a subscriber instruction, generate the request for enabling the virtual SIM card, and send the request for enabling the virtual SIM card to the virtual card server. The virtual SIM card identifier may be an international mobile subscriber identity (IMSI), which is assigned by an operator.

120. Determine, according to the virtual SIM card identifier, whether the second terminal has enabled the virtual SIM card.

130. Enable the virtual SIM card for the first terminal if the second terminal has not enabled the virtual SIM card.

Further, it is possible that the second terminal that shares the virtual SIM card has enabled the virtual SIM card. Because of a limit of a mobile network of an operator, only one terminal uses the virtual SIM card to access the mobile network at a same moment. Thus, the virtual card server determines whether the second terminal has enabled the virtual SIM card; when the second terminal has not enabled the virtual SIM card, enables the virtual SIM card on the first terminal that currently sends the request for enabling the virtual SIM card, that is, modifies a corresponding enabling indication to indicate that the virtual SIM card is enabled on the first terminal that currently sends the request for enabling the virtual SIM card; and sends an enabling success message to the first terminal. The first terminal performs, after receiving the enabling success message, an operation of enabling the virtual SIM card.

According to the method for multiple terminals to share a virtual subscriber identity module SIM card in an embodiment, each terminal that shares a virtual SIM card stores one virtual SIM card as described above, and the virtual card server manages and controls the terminals, so as to ensure that only one of the terminals uses the virtual SIM card to access a mobile network at a same moment, thereby implementing that a plurality terminals of a same subscriber exclusively uses one virtual SIM card to access the mobile network, which simplifies operation steps for the multiple terminals to share the virtual SIM card.

Embodiment 2

The request for enabling the virtual SIM card may further include a subscriber identity.

Further, the first terminal may automatically obtain a terminal identifier of the first terminal and the subscriber identity according to the subscriber instruction, and add them together with the virtual SIM card identifier to the request for enabling the virtual SIM card.

Before step 120, the method further includes: determining whether a subscription relationship exists between the subscriber identity and the virtual SIM card identifier; and when the subscription relationship exists between the subscriber identity and the virtual SIM card identifier, performing a next step; otherwise, ending the procedure. The determining whether the subscription relationship exists between the subscriber identity and the virtual SIM card identifier may facilitate that only an authorized subscriber, that is, a subscriber that has subscribed to the virtual SIM card, can enable the virtual SIM card.

Moreover, in step 120, the determining, according to the virtual SIM card identifier, whether the second terminal has enabled the virtual SIM card includes: querying an enabling relationship table according to the virtual SIM card identifier to determine whether the second terminal has enabled the virtual SIM card, where the enabling relationship table is shown in the following Table 1 and at least includes the virtual SIM card identifier, the terminal identifier, and the enabling indication. It may be learned, by querying the enabling relationship table, whether the second terminal except the first terminal and corresponding to the virtual SIM card identifier has enabled the virtual SIM card.

Table 1 describes enabling relationships.

TABLE 1

Enabling relationship table

| Terminal identifier | Terminal type | Virtual SIM card identifier | Enabling indication |
|---|---|---|---|
| D100001 | Mobile phone | V00001 | Enabled |
| D100002 | Tablet computer | V00001 | Disabled |
| D100003 | Mobile phone | V00001 | Disabled |
| D200001 | Mobile phone | V00002 | Disabled |
| D300001 | Mobile phone | V00003 | Disabled |

The step in this embodiment may be combined with Embodiment 1.

Embodiment 3

A terminal that has enabled the virtual SIM card may disable the virtual SIM card after enabling the virtual SIM card for a period of time, so that another terminal can enable the virtual SIM card.

Figure 2:
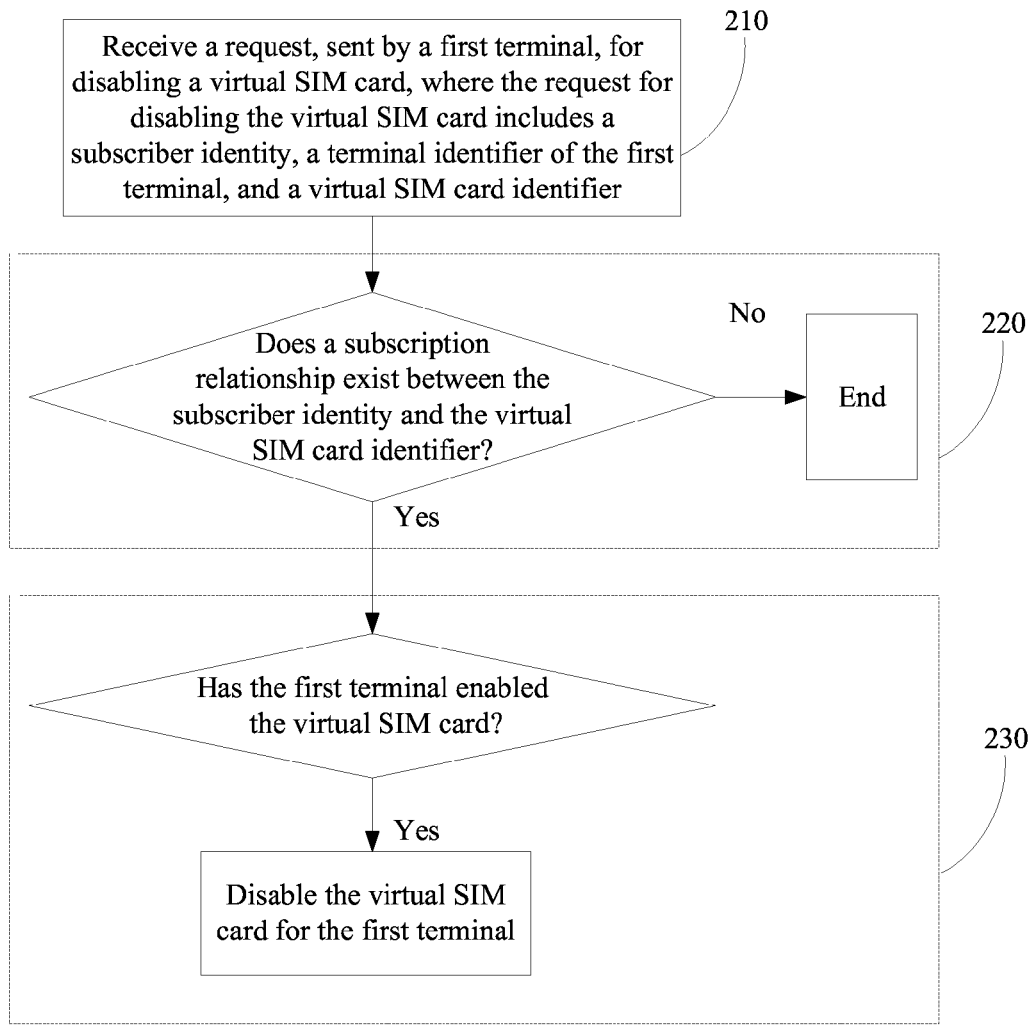
FIG. 2 is a flowchart of an embodiment method for multiple terminals to disable a shared virtual SIM card.

FIG. 2 is a flowchart of a method for multiple terminals to disable a shared virtual SIM card according to Embodiment 3. As shown in FIG. 2, the method may further include the following steps:

210. Receive a request, sent by the first terminal, for disabling the virtual SIM card, where the request for disabling the virtual SIM card includes the subscriber identity, the terminal identifier of the first terminal, and the virtual SIM card identifier.

Further, the terminal may automatically obtain the subscriber identity, the terminal identifier, and the virtual SIM card identifier according to the subscriber instruction and generate the request for disabling the virtual SIM card, and send the request for disabling the virtual SIM card to the virtual card server.

220. Determine whether the subscription relationship exists between the subscriber identity and the virtual SIM card identifier; and when the subscription relationship exists between the subscriber identity and the virtual SIM card identifier, perform a next step; otherwise, end the procedure.

Further, when the subscription relationship exists between the subscriber identity and the virtual SIM card identifier, it indicates that a subscriber corresponding to the subscriber identity has subscribed to the virtual SIM card in advance; the subscriber has permission to disable the virtual SIM card only in this case; otherwise, the subscriber has no permission to disable the virtual SIM card, and the virtual card server feeds back a first disabling error message to the terminal, so as to notify the subscriber that the subscriber has not subscribed to the virtual SIM card.

230. Determine, according to the terminal identifier of the first terminal and the virtual SIM card identifier, whether the first terminal has enabled the virtual SIM card; and when the first terminal has enabled the virtual SIM card, disable the virtual SIM card for the first terminal.

Further, in this step, the enabling relationship table shown in Embodiment 2 may be queried to determine whether the first terminal has enabled the virtual SIM card. The first terminal has permission to disable the virtual SIM card only when the first terminal has enabled the virtual SIM card in advance; otherwise, the first terminal has no permission to disable the virtual SIM card, and the virtual card server feeds back a second disabling error message to the terminal, so as to notify the first terminal that the first terminal has not enabled the virtual SIM card. The disabling the virtual SIM card for the first terminal includes: indicating that the virtual SIM card is disabled on the first terminal, and sending a disabling success message to the first terminal, where the first terminal performs, after receiving the disabling success message, an operation of disabling the virtual SIM card.

The steps in this embodiment may be combined with Embodiment 1 or 2, and are generally performed after the first terminal enables the virtual SIM card.

Embodiment 4

A process in which a subscriber subscribes to a virtual SIM card may be similar to an existing online shopping procedure, for example, a client or a browser is used to subscribe a virtual SIM card on an online store of a virtual card operator. In addition, Embodiment 4 provides an embodiment of a specific subscription method.

Figure 3:
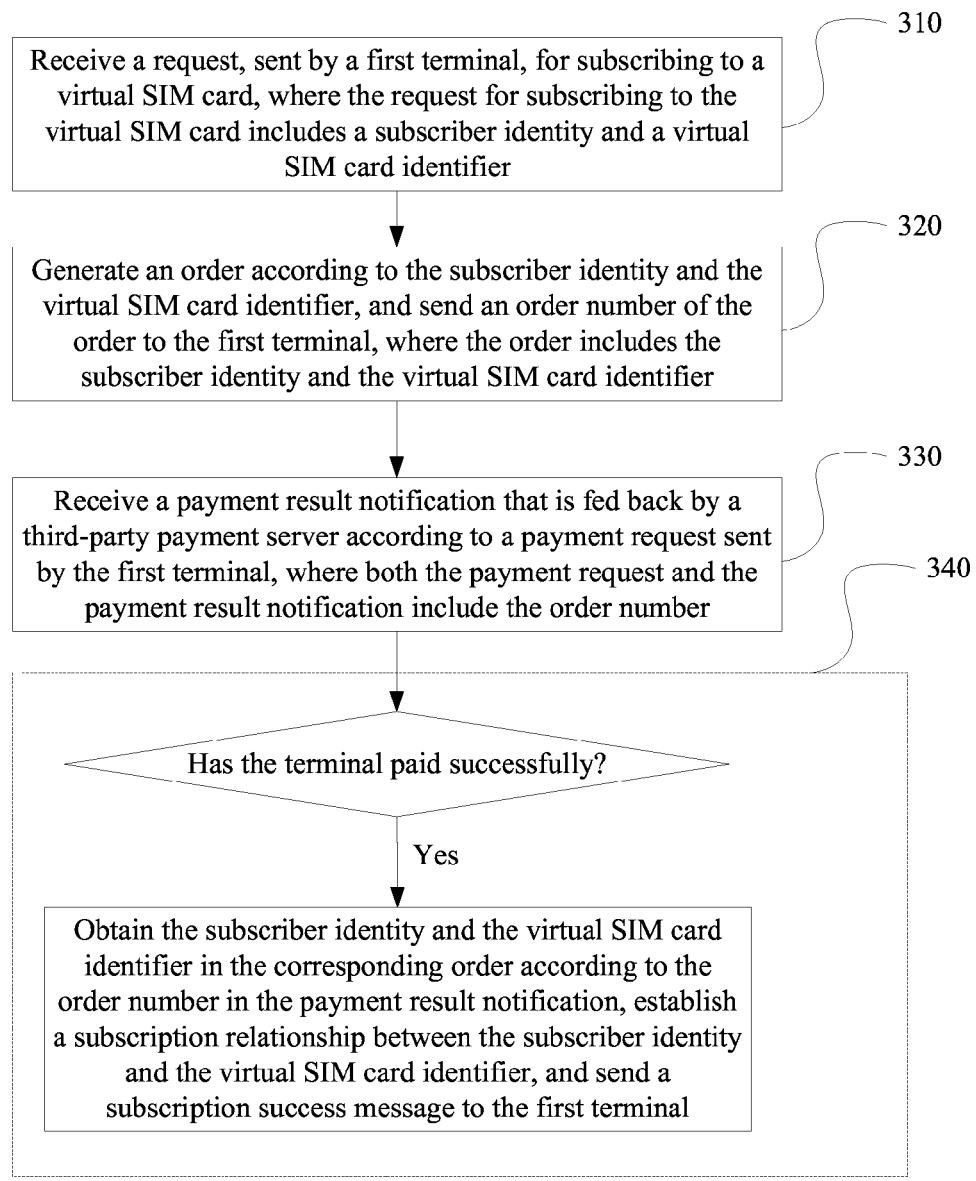
FIG. 3 is a flowchart of an embodiment method for multiple terminals to share a virtual SIM card.

FIG. 3 is a flowchart of a method for multiple terminals to share a virtual SIM card according to Embodiment 4. As shown in FIG. 3, the method may further include the following steps:

310. Receive a request, sent by the first terminal, for subscribing to the virtual SIM card, where the request for subscribing to the virtual SIM card includes the subscriber identity and the virtual SIM card identifier.

Further, the virtual card server may present available virtual SIM card identifiers to the subscriber in advance by using a network for the subscriber to select, and generate a subscriber instruction after selection of the subscriber and input the subscriber instruction to the first terminal; and the first terminal generates, according to the subscriber instruction and the subscriber identity that is registered by the subscriber in advance, the request for subscribing to the virtual SIM card, and sends the request for subscribing to the virtual SIM card to the virtual card server.

320. Generate an order according to the subscriber identity and the virtual SIM card identifier, and send an order number of the order to the first terminal, where the order includes the subscriber identity and the virtual SIM card identifier.

Further, the order records the subscriber identity and the virtual SIM card identifier, and moreover, may additionally record a current state which is that no payment is made. The order number corresponds to the order in a one-to-one manner.

330. Receive a payment result notification that is fed back by a third-party payment server according to a payment request sent by the first terminal, where both the payment request and the payment result notification include the order number.

Further, the first terminal sends the payment request to the third-party payment server after receiving the order number, where the payment request includes the order number and related information such as a bank account. The third-party payment server generates the payment result notification after performing, according to the payment request, an operation of fee deduction, where the payment result notification includes the order number; and feeds back the payment result notification to the virtual card server.

340. Determine, according to the payment result notification, whether the first terminal has paid successfully, and when the first terminal has paid successfully, obtain the subscriber identity and the virtual SIM card identifier in the corresponding order according to the order number in the payment result notification, establish the subscription relationship between the subscriber identity and the virtual SIM card identifier, and send a subscription success message to the first terminal.

Further, after the first terminal has paid successfully, the virtual card server establishes a subscription relationship table shown in the following Table 2 according to the subscriber identity and the virtual SIM card identifier in the corresponding order, and sends the subscription success message to the first terminal, so as to notify the subscriber that the virtual SIM card is downloadable.

TABLE 2

Subscription relationship table

| Subscriber identity | Virtual SIM card identifier | Operator | Amount ($) |
|---|---|---|---|
| U00001 | V00001 | China Mobile | 100 |
| U00002 | V00002 | China Telecom | 200 |
| U00003 | V00003 | Vodafone | 150 |

The steps in this embodiment may be combined with Embodiment 1, 2, or 3, and are generally completed before the first terminal stores the data of the virtual SIM card.

Embodiment 5

A subscriber may download a virtual SIM card after subscribing to the virtual SIM card. Embodiment 5 provides a specific downloading method.

Figure 4:
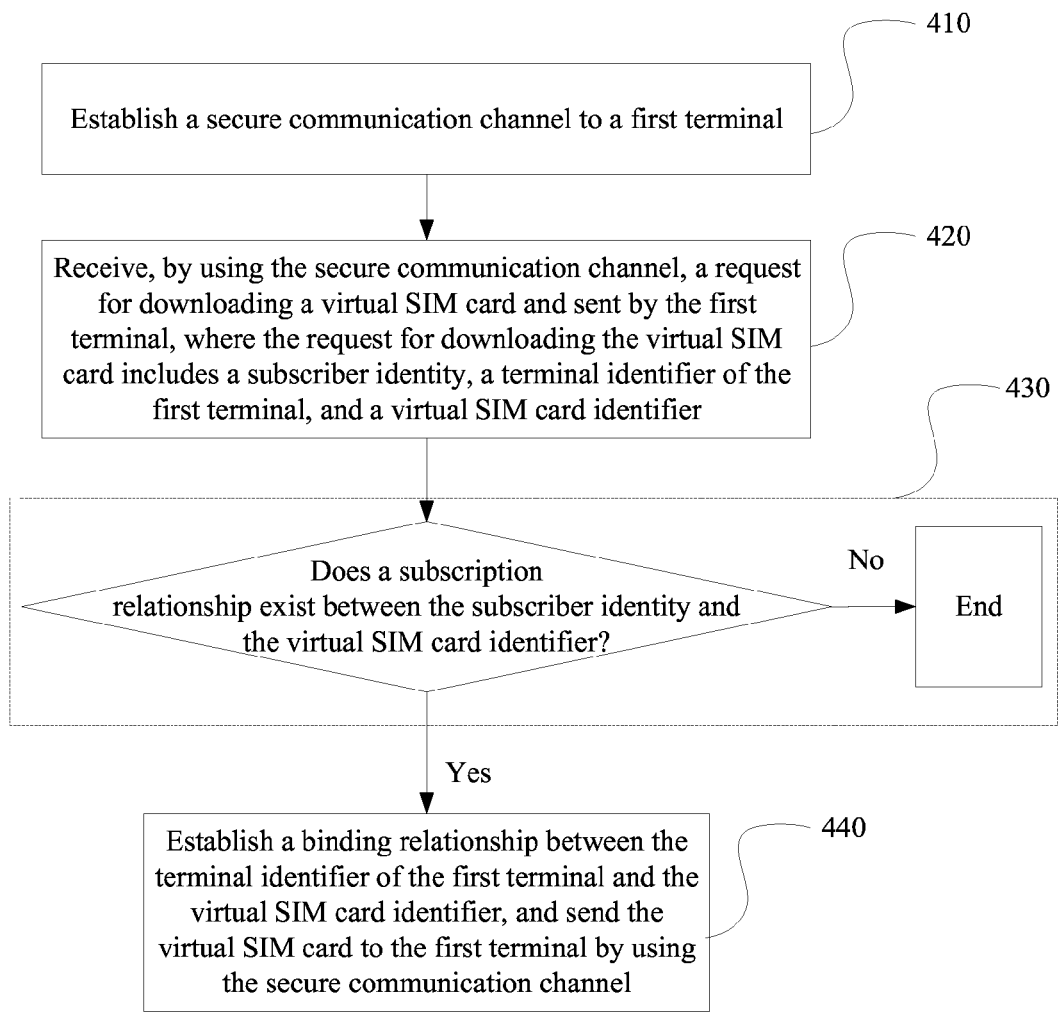
FIG. 4 is a flowchart of an embodiment method for multiple terminals to share a virtual SIM card.

FIG. 4 is a flowchart of a method for multiple terminals to share a virtual SIM card according to Embodiment 5. As shown in FIG. 4, the method may further include the following steps:

410. Establish a secure communication channel to the first terminal.

Further, the secure communication channel may be implemented based on WiFi, or a virtual SIM card capable of accessing the Internet may be preset on the first terminal at delivery, so that the subscriber may have an Internet access capability when the first terminal is purchased. Moreover, the virtual SIM card preset on the first terminal is capable of accessing only limited services, for example, a service of a manufacturer of the first terminal and a service of a virtual card operator. In addition, in the foregoing Embodiment 4, the process in which the first terminal subscribes to the virtual SIM card may also be implemented based on the preset virtual SIM card.

420. Receive, by using the secure communication channel, a request for downloading the virtual SIM card and sent by the first terminal, where the request for downloading the virtual SIM card includes the subscriber identity, the terminal identifier of the first terminal, and the virtual SIM card identifier.

Further, the terminal may generate, according to a subscriber instruction, the request for downloading the virtual SIM card, and send the request for downloading the virtual SIM card to the virtual card server.

430. Determine whether the subscription relationship exists between the subscriber identity and the virtual SIM card identifier; and when the subscription relationship exists between the subscriber identity and the virtual SIM card identifier, perform a next step; otherwise, end the procedure.

Further, when the subscription relationship exists between the subscriber identity and the virtual SIM card identifier, it indicates that a subscriber corresponding to the subscriber identity has subscribed to the virtual SIM card in advance; the subscriber has permission to download the virtual SIM card only in this case; otherwise, the subscriber has no permission to download the virtual SIM card, and the virtual card server feeds back download error information to the terminal, so as to notify the subscriber that the subscriber has not subscribed to the virtual SIM card.

440. Establish a binding relationship between the terminal identifier of the first terminal and the virtual SIM card identifier, and send the virtual SIM card to the first terminal by using the secure communication channel.

Further, at the same time when sending the virtual SIM card to the first terminal, the virtual card server stores a binding relationship table, which is similar to that shown in Table 3, between the terminal identifier and the virtual SIM card identifier, so as to record terminal identifiers of all terminals that downloaded the virtual SIM card, thereby facilitating subsequent determining of whether a corresponding terminal has permission to enable the virtual SIM card. A column of an enabling state is "Disabled" at an initial state, and is updated to "Enabled" after a terminal applies for enabling the virtual SIM card and is allowed by the virtual card server, where 1 and 0 may be used to indicate "Enabled" and "Disabled" respectively.

TABLE 3

Binding relationship table

| Subscriber identity | Terminal identifier | Terminal type | Virtual SIM card identifier | Enabling state |
|---|---|---|---|---|
| U00001 | D100001 | Mobile phone | V00001 | Enabled |
| U00001 | D100002 | Tablet computer | V00001 | Disabled |
| U00001 | D100003 | Mobile phone | V00001 | Disabled |
| U00002 | D200001 | Mobile phone | V00002 | Disabled |
| U00003 | D300001 | Mobile phone | V00003 | Disabled |

The steps in this embodiment may be combined with Embodiment 1, 2, 3, or 4, and are generally completed before the first terminal stores the data of the virtual SIM card.

Embodiment 6

In Embodiment 6, after step 120, the method further includes the following step: if the second terminal has enabled the virtual SIM card, preventing the first terminal from enabling the virtual SIM card.

In other words, in this embodiment, when another terminal except the first terminal has enabled the virtual SIM card and has not disabled the virtual SIM card, the virtual card server prevents the first terminal from enabling the virtual SIM card.

The method according to this embodiment may be combined with Embodiment 1, 2, 3, 4, or 5.

Embodiment 7

In Embodiment 7, after step 120, the method further includes the following step: if the second terminal has enabled the virtual SIM card, enabling the virtual SIM card for the first terminal after disabling the virtual SIM card for the second terminal.

In other words, in this embodiment, when another terminal except the first terminal has enabled the virtual SIM card and has not disabled the virtual SIM card, after receiving the request of the first terminal for enabling the virtual SIM card, the virtual card server allows the first terminal to preempt the virtual SIM card, that is, forces the second terminal to disable the virtual SIM card and enables the virtual SIM card for the first terminal.

The method according to this embodiment may be combined with Embodiment 1, 2, 3, 4, or 5.

Embodiment 8

Figure 5:
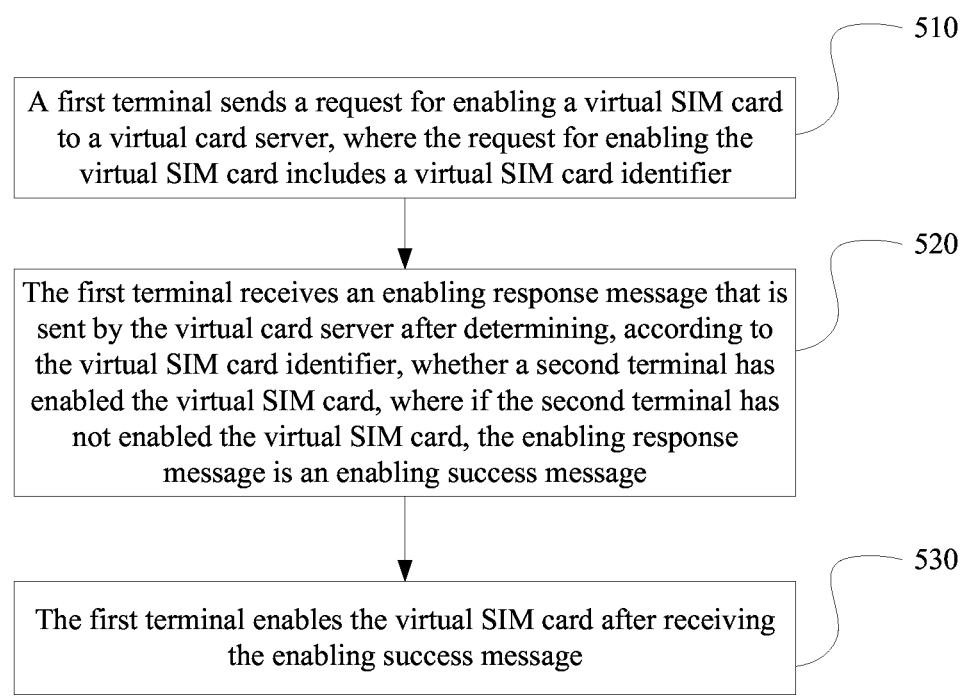
FIG. 5 is a flowchart of an embodiment method for multiple terminals to share a virtual SIM card.

FIG. 5 is a flowchart of a method for multiple terminals to share a virtual SIM card according to Embodiment 8. As shown in FIG. 5, in the method according to Embodiment 8, a first terminal sends a request for enabling the virtual SIM card to a virtual card server, and the first terminal and a second terminal store data of a same virtual SIM card.

The method includes the following steps:

510. The first terminal sends the request for enabling the virtual SIM card to the virtual card server, where the request for enabling the virtual SIM card includes a virtual SIM card identifier.

520. The first terminal receives an enabling response message that is sent by the virtual card server after determining, according to the virtual SIM card identifier, whether the second terminal has enabled the virtual SIM card, where when the second terminal has not enabled the virtual SIM card, the enabling response message is an enabling success message.

530. The first terminal enables the virtual SIM card after receiving the enabling success message.

In addition, when the first terminal does not receive, within preset duration because of a reason such as a network exception, the enabling response message fed back by the virtual card server, the first terminal may re-send the request for enabling the virtual SIM card to the virtual card server, so as to trigger the virtual card server to feed back the enabling response message to the terminal again after performing corresponding determining again, and may also send a state retransmission request to the virtual card server, so as to trigger the virtual card server to retransmit the previously generated enabling response message.

Embodiment 9

Figure 6:
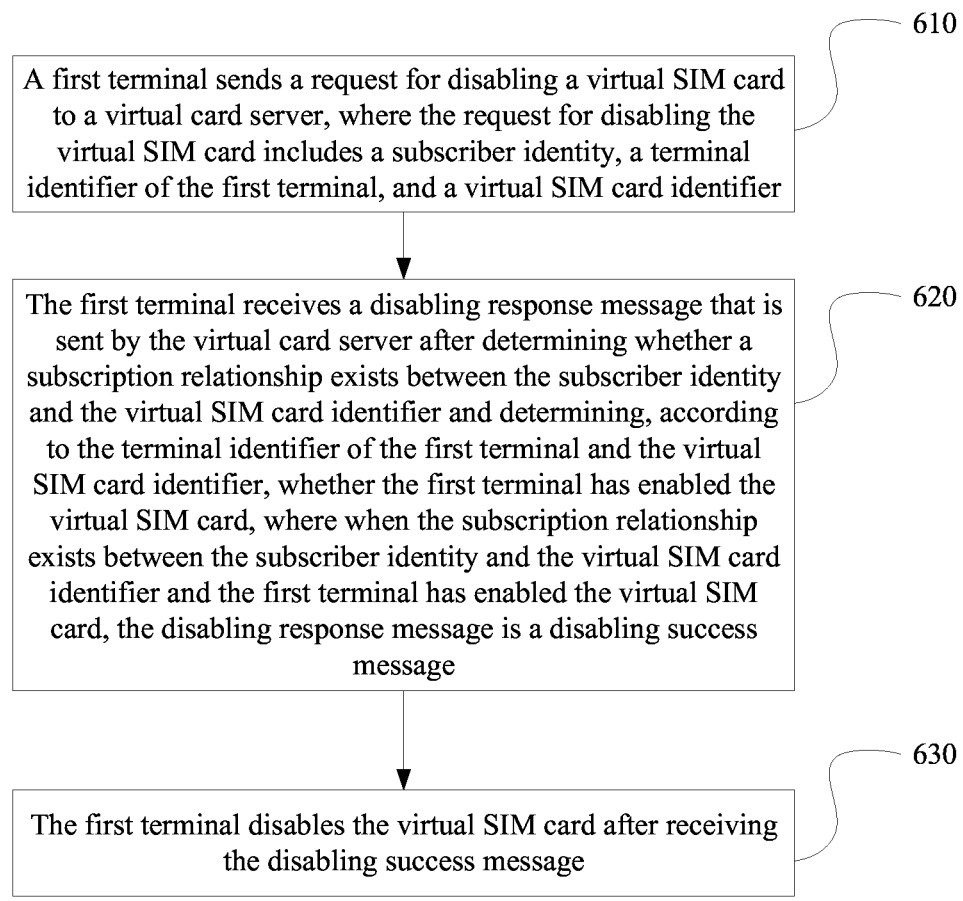
FIG. 6 is a flowchart of an embodiment method for multiple terminals to share a virtual SIM card.

FIG. 6 is a flowchart of a method for multiple terminals to share a virtual SIM card according to Embodiment 9. As shown in FIG. 6, the method may further include the following steps:

610. The first terminal sends a request for disabling the virtual SIM card to the virtual card server, where the request for disabling the virtual SIM card includes a subscriber identity, a terminal identifier of the first terminal, and the virtual SIM card identifier.

620. The first terminal receives a disabling response message that is sent by the virtual card server after determining whether a subscription relationship exists between the subscriber identity and the virtual SIM card identifier and determining, according to the terminal identifier of the first terminal and the virtual SIM card identifier, whether the first terminal has enabled the virtual SIM card, where when the subscription relationship exists between the subscriber identity and the virtual SIM card identifier and the first terminal has enabled the virtual SIM card, the disabling response message is a disabling success message.

When no subscription relationship exists between the subscriber identity and the virtual SIM card identifier, the disabling response message generally is a first disabling error message, so as to notify the subscriber that the subscriber has not subscribed to the virtual SIM card; and when the first terminal has not enabled the virtual SIM card, the disabling response message generally is a second disabling error message, so as to notify the subscriber that the subscriber has not enabled the virtual SIM card.

630. The first terminal disables the virtual SIM card after receiving the disabling success message.

The method according to this embodiment may be combined with Embodiment 8, and is generally performed after the first terminal enables the virtual SIM card.

In addition, when the first terminal does not receive the disabling response message of the virtual card server within the preset duration because of the reason such as the network exception, the first terminal may re-send the request for disabling the virtual SIM card to the virtual card server, so as to trigger the virtual card server to re-send the disabling response message to the first terminal after performing corresponding determining again, and may also send the state retransmission request to the virtual card server, so as to trigger the virtual card server to retransmit the previously generated disabling response message.

Embodiment 10

Figure 7:
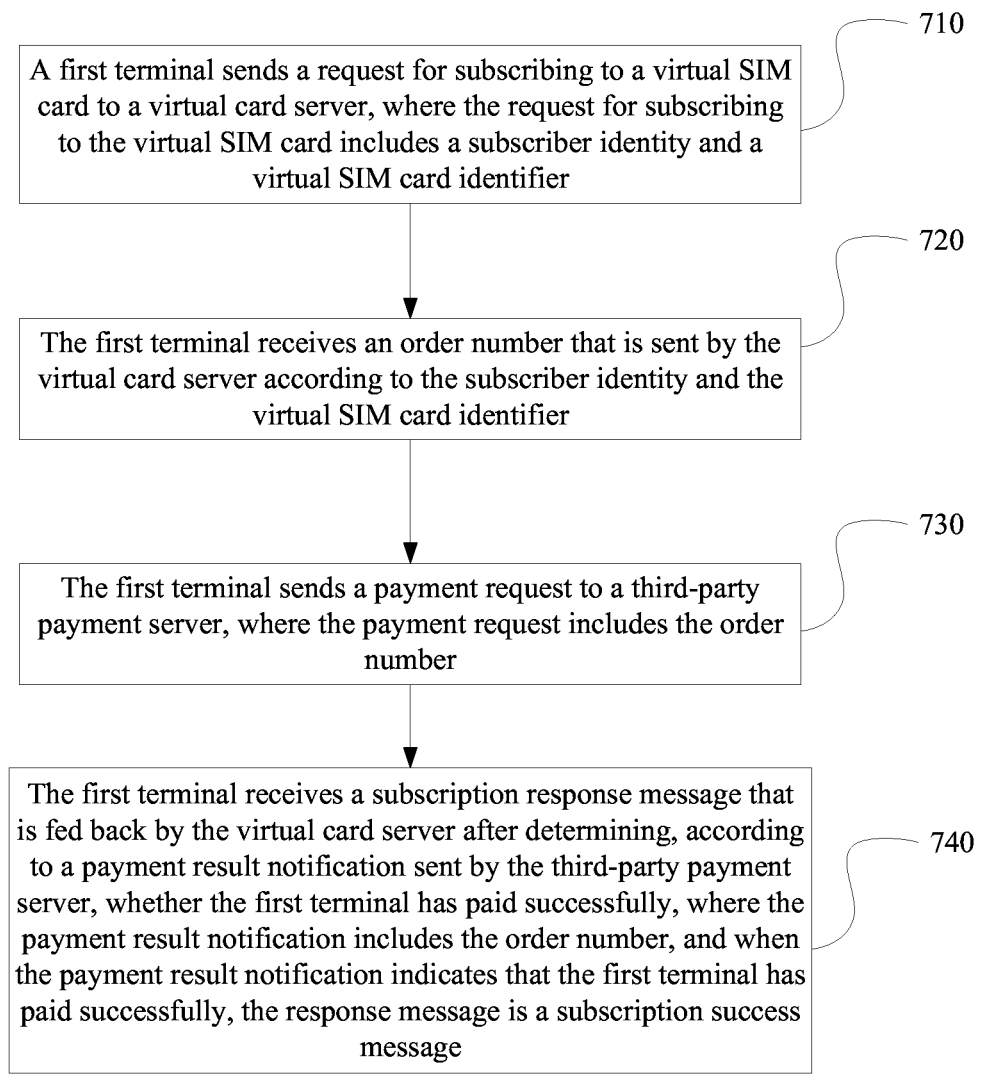
FIG. 7 is a flowchart of an embodiment method for multiple terminals to share a virtual SIM card.

FIG. 7 is a flowchart of a method for multiple terminals to share a virtual SIM card according to Embodiment 10. As shown in FIG. 7, the method may further include the following steps:

710. The first terminal sends a request for subscribing to the virtual SIM card to the virtual card server, where the request for subscribing to the virtual SIM card includes the subscriber identity and the virtual SIM card identifier.

Further, the virtual card server may present available virtual SIM card identifiers to the subscriber in advance by using a network for the subscriber to select, and generate a subscriber instruction after selection of the subscriber and input the subscriber instruction to the first terminal; and the first terminal generates, according to the subscriber instruction and the subscriber identity that is registered by the subscriber in advance, the request for subscribing to the virtual SIM card, and sends the request for subscribing to the virtual SIM card to the virtual card server.

720. The first terminal receives an order number that is sent by the virtual card server according to the subscriber identity and the virtual SIM card identifier.

730. The first terminal sends a payment request to a third-party payment server, where the payment request includes the order number.

Further, the first terminal may send the payment request to the third-party payment server according to the subscriber instruction after receiving the order number, where the payment request includes the order number and related information such as a bank account. The third-party payment server generates the payment result notification after performing, according to the payment request, an operation of fee deduction, where the payment result notification includes the order number; and feeds back the payment result notification to the virtual card server.

740. The first terminal receives a subscription response message that is fed back by the virtual card server after determining, according to a payment result notification sent by the third-party payment server, whether the first terminal has paid successfully, where the payment result notification includes the order number, and when the payment result notification indicates that the first terminal has paid successfully, the response message is a subscription success message.

The method according to this embodiment may be combined with Embodiment 8 or 9, and is may be performed before the first terminal stores the data of the virtual SIM card.

Embodiment 11

Figure 8:
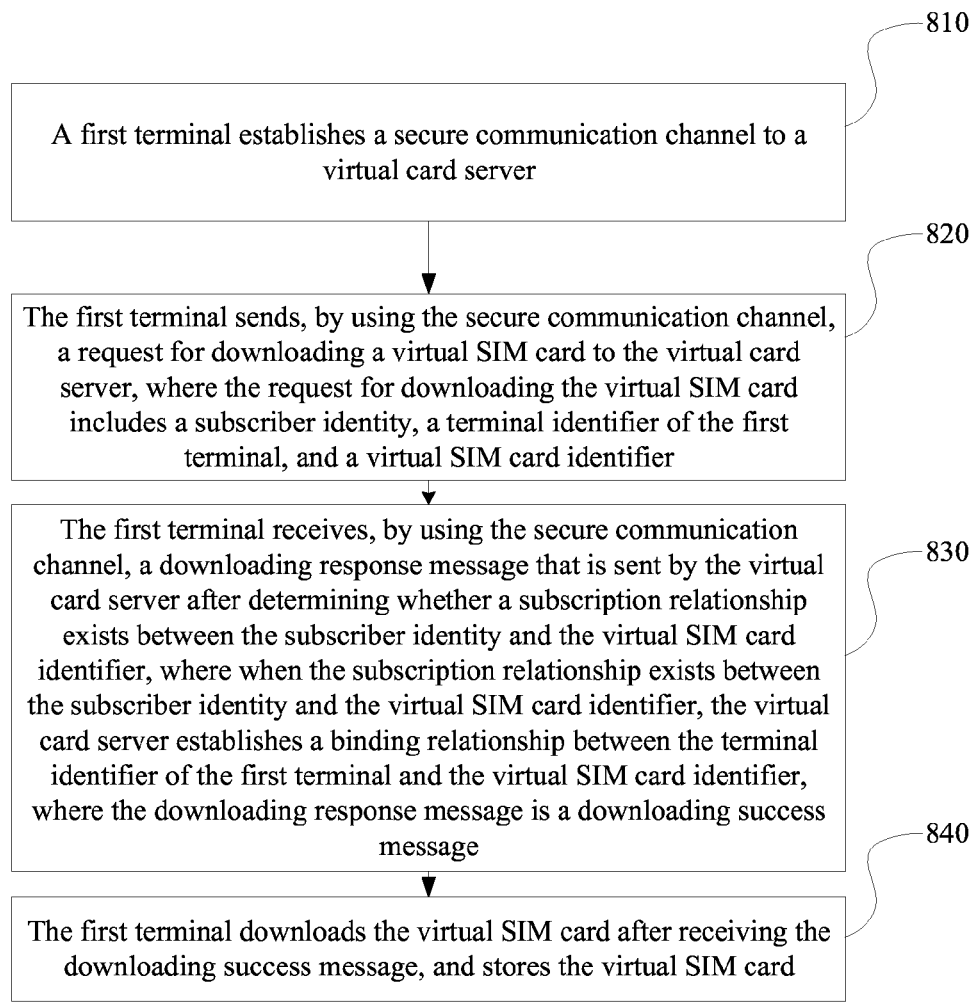
FIG. 8 is a flowchart of an embodiment method for multiple terminals to share a virtual SIM card.

FIG. 8 is a flowchart of a method for multiple terminals to share a virtual SIM card according to Embodiment 11. As shown in FIG. 8, the method may further include the following steps:

810. The first terminal establishes a secure communication channel to the virtual card server.

Further, the secure communication channel may be implemented based on WiFi, or a virtual SIM card capable of accessing the Internet may be preset on the first terminal at delivery, so that the subscriber may have an Internet access capability when the first terminal is purchased. Moreover, the virtual SIM card preset on the first terminal is capable of accessing only limited services, for example, a service of a manufacturer of the first terminal and a service of a virtual card operator. In addition, in the foregoing Embodiment 10, the process in which the terminal subscribes to the virtual SIM card may also be implemented based on the preset virtual SIM card.

820. The first terminal sends, by using the secure communication channel, a request for downloading the virtual SIM card to the virtual card server, where the request for downloading the virtual SIM card includes the subscriber identity, the terminal identifier of the first terminal, and the virtual SIM card identifier.

830. The first terminal receives, by using the secure communication channel, a downloading response message that is sent by the virtual card server after determining whether the subscription relationship exists between the subscriber identity and the virtual SIM card identifier, where when the subscription relationship exists between the subscriber identity and the virtual SIM card identifier, the virtual card server establishes a binding relationship between the terminal identifier of the first terminal and the virtual SIM card identifier, where the downloading response message is a downloading success message.

840. The first terminal downloads the virtual SIM card after receiving the downloading success message, and stores the virtual SIM card.

The method according to this embodiment may be combined with Embodiment 8, 9, or 10, and is generally performed before the first terminal stores the data of the virtual SIM card.

Embodiment 12

Figure 9:
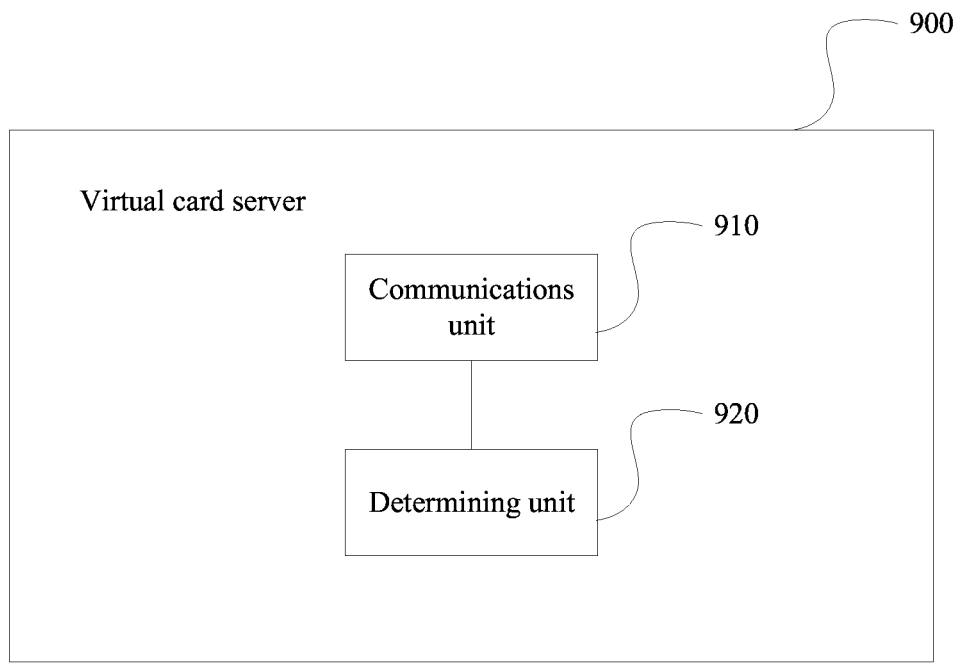
FIG. 9 is a schematic structural diagram of an embodiment virtual card server for implementing that multiple terminals share a virtual SIM card.

FIG. 9 is a schematic structural diagram of a virtual card server for implementing that multiple terminals share a virtual SIM card according to Embodiment 12. As shown in FIG. 9, the virtual card server 900 includes a communications unit 910 and a determining unit 920.

The communications unit 910 is configured to receive a request, sent by a first terminal, for enabling the virtual SIM card, where the request for enabling the virtual SIM card includes a virtual SIM card identifier.

The determining unit 920 is configured to determine, according to the virtual SIM card identifier, whether a second terminal has enabled the virtual SIM card; and enable the virtual SIM card for the first terminal if the second terminal has not enabled the virtual SIM card.

The first terminal and the second terminal store data of the same virtual SIM card.

Embodiment 13

In this embodiment, the determining unit 920 is configured to query an enabling relationship table according to the virtual SIM card identifier to determine whether the second terminal has enabled the virtual SIM card, where the enabling relationship table includes the virtual SIM card identifier, a terminal identifier, and an enabling indication.

In addition, the request for enabling the virtual SIM card further includes a subscriber identity.

Correspondingly, the determining unit 920 is further configured to determine whether a subscription relationship exists between the subscriber identity and the virtual SIM card identifier, and if the subscription relationship exists between the subscriber identity and the virtual SIM card identifier, perform the step of determining, according to the virtual SIM card identifier, whether the second terminal has enabled the virtual SIM card.

Embodiment 14

In this embodiment, the communications unit 910 is further configured to receive a request, sent by a first terminal, for disabling the virtual SIM card, where the request for disabling the virtual SIM card includes a subscriber identity, a terminal identifier of the first terminal, and the virtual SIM card identifier.

The determining unit 920 is further configured to determine whether a subscription relationship exists between the subscriber identity and the virtual SIM card identifier; if the subscription relationship exists between the subscriber identity and the virtual SIM card identifier, determine, according to the terminal identifier of the first terminal and the virtual SIM card identifier, whether the first terminal has enabled the virtual SIM card; and if the first terminal has enabled the virtual SIM card, disable the virtual SIM card for the first terminal.

Embodiment 15

Figure 10:
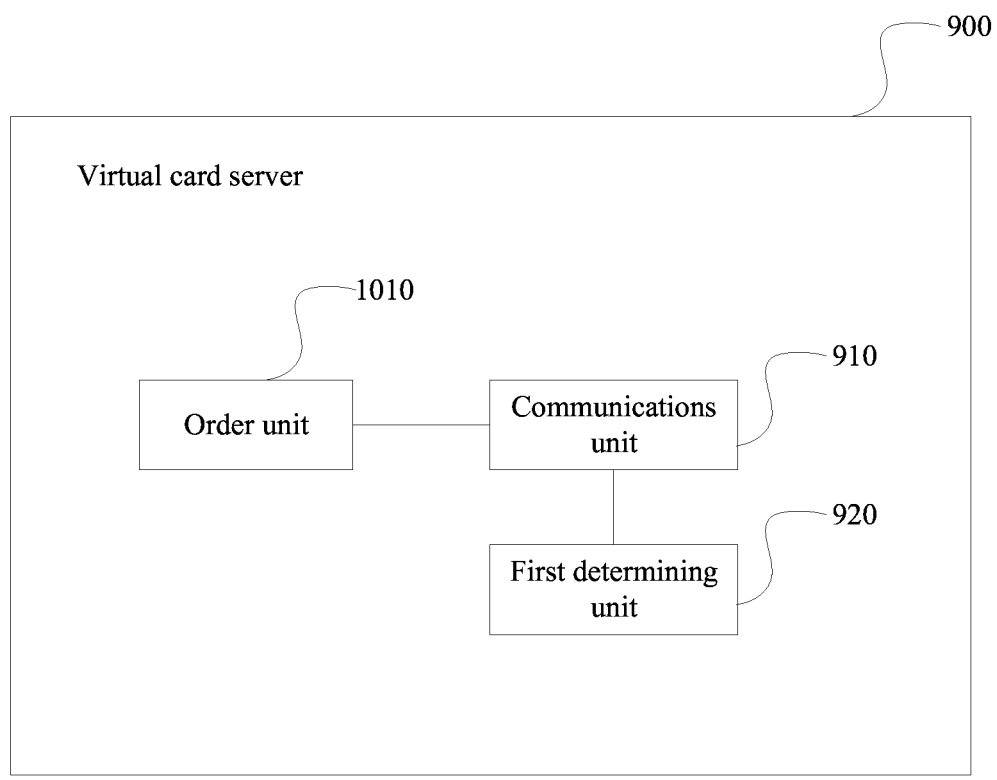
FIG. 10 is a schematic structural diagram of an embodiment virtual card server for implementing that multiple terminals share a virtual SIM card.

In this embodiment, as shown in FIG. 10, the virtual card server 900 further includes an order unit 1010 for processing a related procedure in which a terminal subscribes to a virtual SIM card.

Further, the communications unit 910 is further configured to receive a request, sent by a first terminal, for subscribing to the virtual SIM card, where the request for subscribing to the virtual SIM card includes a subscriber identity and the virtual SIM card identifier.

The order unit 1010 is configured to generate an order according to the subscriber identity and the virtual SIM card identifier, and send an order number of the order to the first terminal, where the order includes the subscriber identity and the virtual SIM card identifier.

The communications unit 910 is further configured to receive a payment result notification that is fed back by a third-party payment server according to a payment request sent by the first terminal, where both the payment request and the payment result notification include the order number.

The determining unit 920 is further configured to determine, according to the payment result notification, whether the first terminal has paid successfully, and if the first terminal has paid successfully, obtain the subscriber identity and the virtual SIM card identifier in the corresponding order according to the order number in the payment result notification, establish a subscription relationship between the subscriber identity and the virtual SIM card identifier, and send a subscription success message to the first terminal.

Embodiment 16

In this embodiment, the determining unit 920 is further configured to: when determining, according to the virtual SIM card identifier, whether the second terminal has enabled the virtual SIM card, and if the second terminal has enabled the virtual SIM card, prevent the first terminal from enabling the virtual SIM card.

This embodiment may be combined with Embodiment 12, 13, 14, or 15.

Embodiment 17

In this embodiment, when determining, according to the virtual SIM card identifier, whether the second terminal has enabled the virtual SIM card, and if the second terminal has enabled the virtual SIM card, the determining unit 920 enables the virtual SIM card for the first terminal after disabling the virtual SIM card for the second terminal.

This embodiment may be combined with Embodiment 12, 13, 14, or 15.

Embodiment 18

Figure 11:
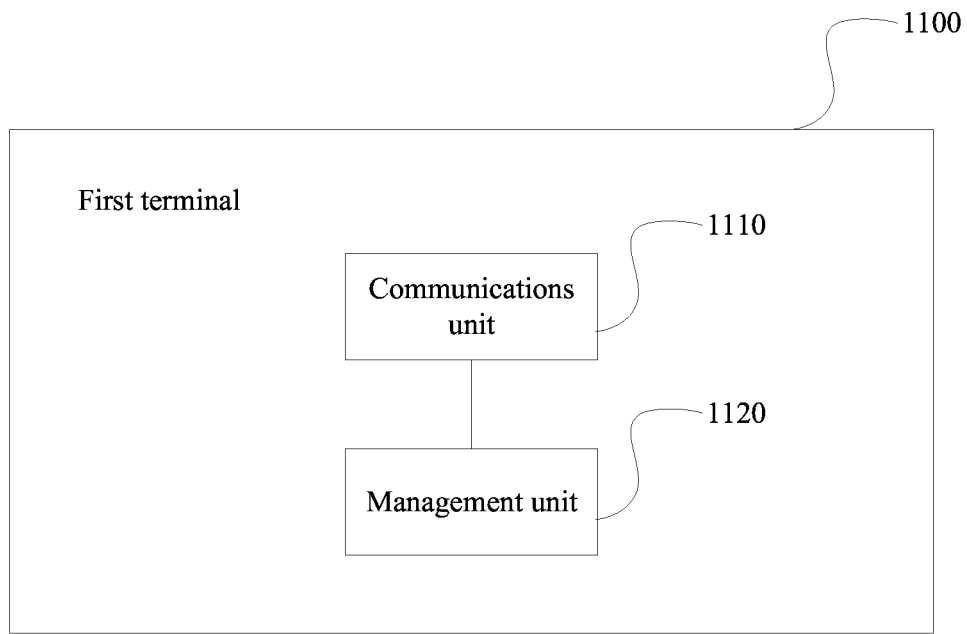
FIG. 11 is a schematic structural diagram of an embodiment first terminal for implementing that multiple terminals share a virtual SIM card.

FIG. 11 is a schematic structural diagram of a terminal for implementing that multiple terminals share a virtual SIM card according to Embodiment 18, where the terminal includes a first terminal and a second terminal that store data of a same virtual SIM card. As shown in FIG. 11, the first terminal 1100 includes a communications unit 1110 and a management unit 1120.

The communications unit 1110 is configured to send a request for enabling the virtual SIM card to a virtual card server, where the request for enabling the virtual SIM card includes a virtual SIM card identifier, and receive an enabling response message that is sent by the virtual card server after determining, according to the virtual SIM card identifier, whether the second terminal has enabled the virtual SIM card, where if the second terminal has not enabled the virtual SIM card, the enabling response message is an enabling success message.

The management unit 1120 is configured to enable the virtual SIM card after the communications unit receives the enabling success message. In addition, the second terminal and the first terminal have a same structure, which is not described repeatedly.

Embodiment 19

In this embodiment, the communications unit 1110 is further configured to send a request for disabling the virtual SIM card to the virtual card server, where the request for disabling the virtual SIM card includes a subscriber identity, a terminal identifier of the first terminal, and the virtual SIM card identifier, and receive a disabling response message that is sent by the virtual card server after determining whether a subscription relationship exists between the subscriber identity and the virtual SIM card identifier and determining, according to the terminal identifier of the first terminal and the virtual SIM card identifier, whether the first terminal has enabled the virtual SIM card, where if the subscription relationship exists between the subscriber identity and the virtual SIM card identifier and when the first terminal has enabled the virtual SIM card, the disabling response message is a disabling success message. The management unit 1120 is further configured to disable the virtual SIM card after the communications unit receives the disabling success message.

Embodiment 20

In this embodiment, the communications unit 1110 is further configured to send a request for subscribing to the virtual SIM card to the virtual card server, where the request for subscribing to the virtual SIM card includes a subscriber identity and the virtual SIM card identifier, and receive an order number that is sent by the virtual card server according to the subscriber identity and the virtual SIM card identifier; send a payment request to a third-party payment server, where the payment request includes the order number; and receive a subscription response message that is fed back by the virtual card server after determining, according to a payment result notification sent by the third-party payment server, whether the first terminal has paid successfully, where the payment result notification includes the order number, and if the payment result notification indicates that the first terminal has paid successfully, the subscription response message is a subscription success message.

Embodiment 21

This embodiment provides a system for multiple terminals to share a virtual SIM card, where the system includes the virtual card server according to any one of Embodiments 12 to 17 and the terminal according to any one of Embodiments 18 to 20.

Figure 12:
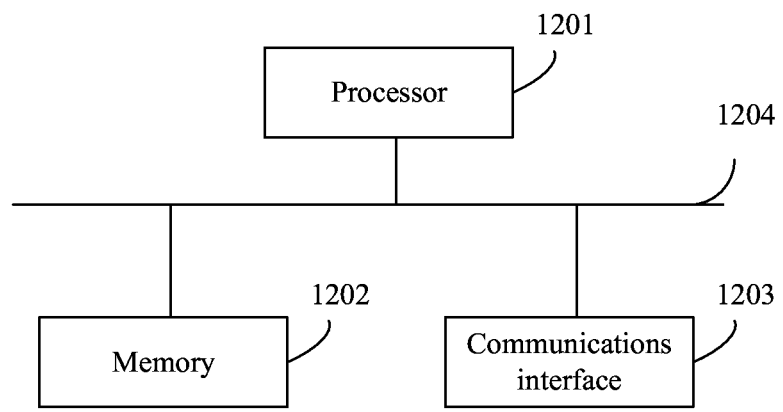
FIG. 12 shows an embodiment of a virtual card server implemented based on a computer system.

The virtual card server in this embodiment may be implemented based on a computer system, and the methods shown in FIG. 1, FIG. 2, FIG. 3, and FIG. 4 may all be implemented on the virtual card server based on the computer system. FIG. 12 shows an embodiment of a virtual card server implemented based on a computer system. The virtual card server in this embodiment may include a processor 1201, a memory 1202, and a communications interface 1203.

The communications interface 1203 is configured to communicate with a first terminal. Messages exchanged between the first terminal and the virtual card server all are sent and received through the communications interface 1203. Further, the communications interface 1203 is configured to receive a request for enabling a virtual SIM card, a request for disabling the virtual SIM card, and a request for subscribing to the virtual SIM card that are sent by the first terminal.

The memory 1202 is configured to store a program instruction.

The processor 1201 is configured to: after the request for enabling the virtual SIM card and sent by the first terminal is received, invoke the program instruction stored in the memory 1202 to perform the following operations: determining, according to a virtual SIM card identifier, whether a second terminal has enabled the virtual SIM card; and enabling the virtual SIM card for the first terminal if the second terminal has not enabled the virtual SIM card.

The processor 1201 is further configured to: after the request for disabling the virtual SIM card and sent by the first terminal is received, invoke the program instruction stored in the memory 1202 to perform the following operations: determining whether a subscription relationship exists between a subscriber identity and the virtual SIM card identifier; if the subscription relationship exists between a subscriber identity and the virtual SIM card identifier, determining, according to the terminal identifier of the first terminal and the virtual SIM card identifier, whether the first terminal has enabled the virtual SIM card; and if the first terminal has enabled the virtual SIM card, disabling the virtual SIM card for the first terminal.

The processor 1201 is further configured to: after the request for subscribing to the virtual SIM card sent by the first terminal is received, invoke the program instruction stored in the memory 1202 to perform the following operations:

generating an order according to the subscriber identity and the virtual SIM card identifier, and sending an order number of the order to the first terminal, where the order includes the subscriber identity and the virtual SIM card identifier;

receiving a payment result notification that is fed back by a third-party payment server according to a payment request sent by the first terminal, where both the payment request and the payment result notification include the order number; and determining, according to the payment result notification, whether the first terminal has paid successfully, and if the first terminal has paid successfully, obtaining the subscriber identity and the virtual SIM card identifier in the corresponding order according to the order number in the payment result notification, establishing a subscription relationship between the subscriber identity and the virtual SIM card identifier, and sending a subscription success message to the first terminal.

The processor 1201 may be a central processing unit (CPU), an application-specific integrated circuit (ASIC), or the like. The virtual card server in this embodiment may include a bus 1204. The processor 1201, the memory 1202, and the communications interface 1203 may be connected to and communicate with each other by using the bus 1204. The memory 1202 may include an entity having a storage function, such as a random access memory (RAM), a read-only memory (ROM), or a magnetic disk.

Figure 13:
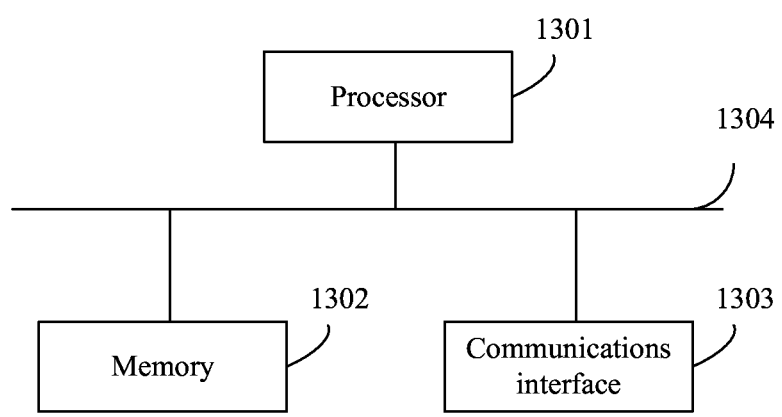
FIG. 13 shows an embodiment of a first terminal implemented based on a computer system.

The first terminal in this embodiment may be implemented based on a computer system, and the methods shown in FIG. 5, FIG. 6, FIG. 7, and FIG. 8 may all be implemented on the terminal based on the computer system. FIG. 13 shows an embodiment of a first terminal implemented based on a computer system. The first terminal in this embodiment may include a processor 1301, a memory 1302, and a communications interface 1303.

The communications interface 1303 is configured to communicate with the virtual card server. Messages (as shown in method embodiments in FIG. 5, FIG. 6, FIG. 7, and FIG. 8) exchanged between the first terminal and the virtual card server all are sent and received through the communications interface 1303. The memory 1302 is configured to store a program instruction.

The processor 1301 is configured to enable the virtual SIM card after receiving an enabling success message.

The processor 1301 is further configured to disable the virtual SIM card after receiving a disabling success message.

The processor 1301 may be a CPU, an ASIC, or the like. The first terminal in this embodiment may include a bus 1304. The processor 1301, the memory 1302, and the communications interface 1303 may be connected to and communicate with each other by using the bus 1304. The memory 1302 may include an entity having a storage function, such as a RAM, a read-only memory ROM, or a magnetic disk.

In addition, the second terminal and the first terminal have a same hardware structure, which is not described repeatedly.

According to the method, the terminal, the server, and the system for multiple terminals to share a virtual SIM card in the embodiments, a first terminal and a second terminal store data of a same virtual SIM card, and the method includes: receiving a request, sent by the first terminal, for enabling the virtual SIM card, where the request for enabling the virtual SIM card includes a virtual SIM card identifier; determining, according to the virtual SIM card identifier, whether the second terminal has enabled the virtual SIM card; and enabling the virtual SIM card for the first terminal if the second terminal has not enabled the virtual SIM card. According to the method for multiple terminals to share a virtual SIM card, each terminal that shares the virtual SIM card stores one virtual SIM card as described above, and a virtual card server manages and controls the terminals, so as to ensure that only one of the terminals uses the virtual SIM card to access a mobile network at a same moment, thereby implementing that a plurality terminals of a same subscriber exclusively uses one virtual SIM card to access the mobile network, which simplifies operation steps for the multiple terminals to share the virtual SIM card.

A person of ordinary skill in the art may understand that the aspects of the present invention or the possible implementation manners of the aspects may be implemented as a system, a method, or a computer program product. Therefore, the aspects of the present invention or the possible implementation manners of the aspects may use a form of an entirely hardware embodiment, an entirely software embodiment (including firmware, resident software, and the like), or an embodiment combining software and hardware aspects, which are all generally be referred to as a "circuit", a "module", or a "system". In addition, the aspects of the present invention or the possible implementation manners of the aspects may use a form of a computer program product, and the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductor system, terminal, or apparatus or any proper combination of the foregoing, such as RAM, a ROM, an erasable programmable read-only memory (EPROM or a flash memory), an optical fiber, or a portable read-only memory (CD-ROM).

A processor in the computer reads the computer-readable program code in the computer-readable medium, so that the processor can perform a functional action specified in each step or a combination of steps in a flowchart, and generate an apparatus that implements a functional action specified in each block or a combination of blocks in a block diagram.

The computer-readable program code can be performed completely on a computer of a subscriber, partially on the computer of the subscriber, as an independent software package, partially on the computer of the subscriber, partially on a remote computer, or completely on the remote computer or a remote server. It should also be noted that in some replacement implementation solutions, the steps in the flowchart or functions specified by the blocks in the block diagram may not occur in a sequence specified in the diagram. For example, depending on an involved function, two steps or two blocks that are specified continuously may be performed almost simultaneously, or these blocks may be performed in a reversed sequence sometime.

It is obvious that a person skilled in the art may make various modifications and alternations to the present invention without departing from the spirit and scope of the present invention. In this way, the present invention is also intended to include these modifications and alterations if the modifications and alterations to the present invention fall within the scope of the claims and equivalent technologies of the present invention.

What is claimed is:

1. A method comprising:
receiving, by a virtual card server from a first terminal, a request for enabling a virtual subscriber identity module (SIM) card not having a corresponding physical SIM card, wherein the request for enabling the virtual SIM card comprises a virtual SIM card identifier, and wherein the first terminal stores first data of the virtual SIM card and a second terminal stores second data of the virtual SIM card;
determining whether the second terminal has enabled the virtual SIM card in accordance with the virtual SIM card identifier;
enabling the virtual SIM card for the first terminal when the second terminal has not enabled the virtual SIM card; and
receiving a request from the first terminal, for disabling the virtual SIM card, after enabling the virtual SIM card for the first terminal, wherein the request for disabling the virtual SIM card comprises a subscriber identity, a terminal identifier of the first terminal, and the virtual SIM card identifier.

2. The method of claim 1, wherein determining whether the second terminal has enabled the virtual SIM card comprises querying an enabling relationship table in accordance with the virtual SIM card identifier to determine whether the second terminal has enabled the virtual SIM card, wherein the enabling relationship table comprises the virtual SIM card identifier, a terminal identifier, and an enabling indication.

3. A method comprising:
receiving, by a virtual card server from a first terminal, a request for enabling a virtual SIM card, wherein the request for enabling the virtual SIM card comprises a virtual SIM card identifier and a subscriber identity, and wherein the first terminal stores first data of the virtual SIM card and a second terminal stores second data of the virtual SIM card;
determining whether a subscription relationship exists between a subscriber identity and the virtual SIM card identifier;
determining whether the second terminal has enabled the virtual SIM card in accordance with the virtual SIM card identifier, after determining whether the subscription relationship exists between the subscriber identity and the virtual SIM card identifier; and
enabling the virtual SIM card for the first terminal when the second terminal has not enabled the virtual SIM card.

4. The method of claim 1, the method further comprising:
determining whether a subscription relationship exists between the subscriber identity and the virtual SIM card identifier; if the subscription relationship exists between the subscriber identity and the virtual SIM card identifier, determining, according to the terminal identifier of the first terminal and the virtual SIM card identifier, whether the first terminal has enabled the virtual SIM card; and if the first terminal has enabled the virtual SIM card, disabling the virtual SIM card for the first terminal.

5. The method of claim 1, the method further comprising:
receiving, by the virtual card server from the first terminal, a request for subscribing to the virtual SIM card before the first terminal stores the first data of the virtual SIM card, wherein the request for subscribing to the virtual SIM card comprises a subscriber identity and the virtual SIM card identifier;
generating an order in accordance with the subscriber identity and the virtual SIM card identifier;
sending, by the virtual card server to the first terminal, an order number of the order, wherein the order comprises the subscriber identity and the virtual SIM card identifier;
receiving, by the virtual card server from a third party payment server, a payment result notification in accordance with a payment request from first terminal, wherein the payment request comprises an order number and the payment result notification comprise the order number;
determining, in accordance with the payment result notification, whether the first terminal has paid successfully; and
obtaining the subscriber identity and the virtual SIM card identifier in accordance with the order number in the payment result notification, establishing a subscription relationship between the subscriber identity and the virtual SIM card identifier, and sending a subscription success message, from the virtual card server to the first terminal, when the first terminal has paid successfully.

6. A method comprising:
sending, by a first terminal to a virtual card server, a request for enabling a virtual subscriber identity module (SIM) card not having a corresponding physical SIM card, wherein the request for enabling the virtual SIM card comprises a virtual SIM card identifier, wherein the first terminal stores first data of the virtual SIM card, and wherein a second terminal stores second data of the virtual SIM card;
determining whether the second terminal has enabled the virtual SIM card;
receiving, by the first terminal from the virtual card server, an enabling response message after determining whether the second terminal has enabled the virtual SIM card, wherein, when the second terminal has not enabled the virtual SIM card, the enabling response message is an enabling success message;
enabling, by the first terminal, the virtual SIM card after receiving the enabling success message; and
sending, by the first terminal to a virtual card server, a request for disabling the virtual SIM card after enabling the virtual SIM card, wherein the request for disabling the virtual SIM card comprises a subscriber identity, a terminal identifier of the first terminal, and the virtual SIM card identifier.

7. The method of claim 6, the method further comprising:
determining whether a subscription relationship exists between the subscriber identity and the virtual SIM card identifier;
determining, in accordance with the terminal identifier of the first terminal and the virtual SIM card identifier, whether the first terminal has enabled the virtual SIM card;

receiving, by the first terminal from the virtual card server, a disabling response message after determining whether the subscription relationship exists between the subscriber identity and the virtual SIM card identifier and after determining whether the first terminal has enabled the virtual SIM card, wherein the disabling response message is a disabling success message when the subscription relationship exists between the subscriber identity and the virtual SIM card identifier and the first terminal has enabled the virtual SIM card; and disabling, by the first terminal, the virtual SIM card after receiving the disabling success message.

8. The method of claim 6, the method further comprising:

sending, by the first terminal to a virtual card server, a request for subscribing to the virtual SIM card before the first terminal stores the first data of the virtual SIM card, wherein the request for subscribing to the virtual SIM card comprises a subscriber identity and the virtual SIM card identifier;

receiving, by the first terminal from the virtual card server, in accordance with the subscriber identity and the virtual SIM card identifier;

sending, by the first terminal to a third-party payment server, a payment request, wherein the payment request comprises an order number;

determining, in accordance with a payment result notification from the third-party payment server, whether the first terminal has paid successfully; and receiving, by the first terminal from the virtual card server, a subscription response message after determining whether the first terminal has paid successfully, wherein the payment result notification comprises the order number, and wherein the subscription response message is a subscription success message when the payment result notification indicates that the first terminal has paid successfully.

9. A virtual card server comprising:

a processor; and a non-transitory computer-readable storage medium storing programming for execution by the processor, the programming including instructions to:

receive a request for enabling a virtual subscriber identity module (SIM) card not having a corresponding physical SIM card, from a first terminal;

receive a request for disabling the virtual SIM card from the first terminal;

receive a request for subscribing to the virtual SIM card from the first terminal;

determine, in accordance with a virtual SIM card identifier, whether a second terminal has enabled the virtual SIM card;

enable the virtual SIM card for the first terminal after the request for enabling the virtual SIM card from the first terminal is received when the second terminal has not enabled the virtual SIM card;

generate an order in accordance with a subscriber identity and the virtual SIM card identifier after the request for subscribing to the virtual SIM card from the first terminal is received;

send an order number of the order to the first terminal, wherein the order comprises the subscriber identity and the virtual SIM card identifier; and receive a payment result notification from a third-party payment server in accordance with a payment request received from the first terminal, wherein the payment request comprises an order number and the payment result notification comprises the order number.

10. The virtual card server of claim 9, wherein the programming further includes instructions to:

determine whether a subscription relationship exists between a subscriber identity and the virtual SIM card identifier after the request for disabling the virtual SIM card from the first terminal is received;

determine, according to a terminal identifier of the first terminal and the virtual SIM card identifier, whether the first terminal has enabled the virtual SIM card when the subscription relationship exists between the subscriber identity and the virtual SIM card identifier; and disable the virtual SIM card for the first terminal when the first terminal has enabled the virtual SIM card.

11. The virtual card server of claim 9, wherein the programming further includes instructions to:

determine whether the first terminal has paid successfully in accordance with the payment result notification; and obtain the subscriber identity and the virtual SIM card identifier in the order according to the order number in the payment result notification and establish a subscription relationship between the subscriber identity and the virtual SIM card identifier, and send a subscription success message to the first terminal, when the first terminal has paid successfully.

\* \* \* \* \*